J C. McALEXANDER
F. J. BROWN
BY [signature]
ATTORNEY 3,426,425
Patented Feb. 11, 1969

3,426,425

WINDING METHODS

Ford J. Brown, Kutztown, and Joseph C. McAlexander, Jr., Center Valley, Pa., said Brown assignor to Western Electric Company, Incorporated, New York, N.Y., a corporation of New York, and said McAlexander assignor to Bell Telephone Laboratories, Incorporated, Murray Hill, Berkeley Heights, N.J., a corporation of New York Filed Oct. 28, 1966, Ser. No. 590,246
U.S. Cl. 29—605 3 Claims
Int. Cl. H01f *7/06;* B65h *81/06*

This invention relates generally to methods of winding and bonding a strand about an article, and more particularly to winding an adhesive coated ribbon about flat tape in a modified helix such that a major portion of each convolution lies in a plane perpendicular to the longitudinal axis of the tape and an end section is wound at an angle, and bonding the ribbon to the tape as it is wound. Accordingly, the general objects of the invention are to provide new and improved methods of such character.

In the manufacture of certain types of magnetic memory elements known as "twistors," a winding and bonding problem of the foregoing type was encountered, and the specific embodiment of the invention relates to winding twistor cables with a copper ribbon. Basically, a twistor cable includes small diameter wire covered with anisotropic magnetic material having a preferred axis of magnetization helically disposed with respect to the wire. A memory system can include a plurality of parallel twistor wires laminated into a plastic tape, contained within a fold of solenoid copper straps, in such a manner that the copper straps are accurately placed across the twistor wires at right angles, each intersection constituting a single bit location. The twistor is described in greater detail by A. H. Bobeck in an article entitled, "A New Storage Element for Large-Sized Arrays, the Twistor," Bell System Technical Journal, vol. XXXVI, No. 6, pp. 1319–1340 (November 1957). To accomplish volume production, it is preferable to wind and bond the copper ribbon directly onto indeterminate lengths of twistor cable.

Thus, another object of the invention is to provide new and improved methods for winding and bonding a conductive ribbon transversely onto both sides of a laminated tape.

With the foregoing and other objects in view, apparatus can be provided, generally, for winding and bonding a strand about a tape. Suitable means can be provided for feeding the tape in fixed steps into a winding position, and for winding the strand in fixed steps about the longitudinal axis of the tape. A pair of pressing rollers, oppositely disposed to each surface of the tape, can be arranged to be extendable transversely to its longitudinal axis, so that the strand is pressed onto the tape as the strand is placed transversely to the longtiudinal axis of the tape.

A strand can be wound in a modified helical pattern about a tape by initially positioning the tape with respect to a winding plane such that its longitudinal axis is perpendicular to the winding plane. The strand, then, is wound about the tape in the winding plane through an arc less than one full revolution to form a partial convolution of the strand. The pressing rollers are moved transversely across the tape to bond the partial convolution to the tape. The transverse movement of the pressing rollers is then halted. Following, the tape and pressing rollers are longitudinally moved with respect to the winding plane to displace the partial convolution from the winding plane. The strand is then wound further about the tape, completing a full revolution, thereby forming an angled section at the end of the convolution due to the displacement. The pressing rollers have their movement continued in the transverse direction to bond the angled section of the convolution to the tape, the rollers being of sufficient width for this purpose. The pressing rollers are then reversed to re-press the convoluted strand onto the tape. The procedure is repeated, thereby winding the strand in a modified helix about the tape.

Other objects, advantages and features of the invention will be apparent from the following detailed description of a specific embodiment thereof, when read in conjunction with the appended drawings in which.

*General arrangement*

Figure 1:
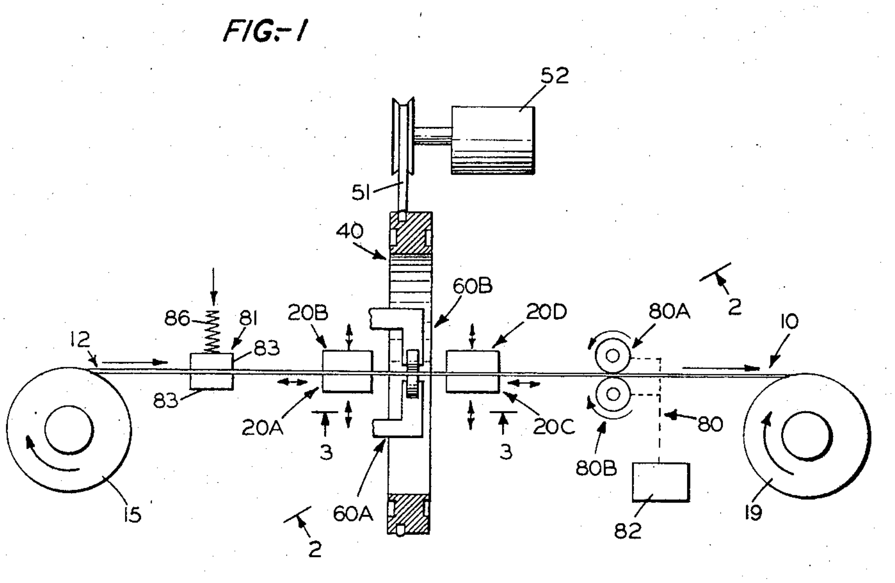
FIG. 1 is a partially schematic top view showing a winding and bonding apparatus suitable for practicing the methods in accordance with the specific embodiment of the invention.
Figure 2:
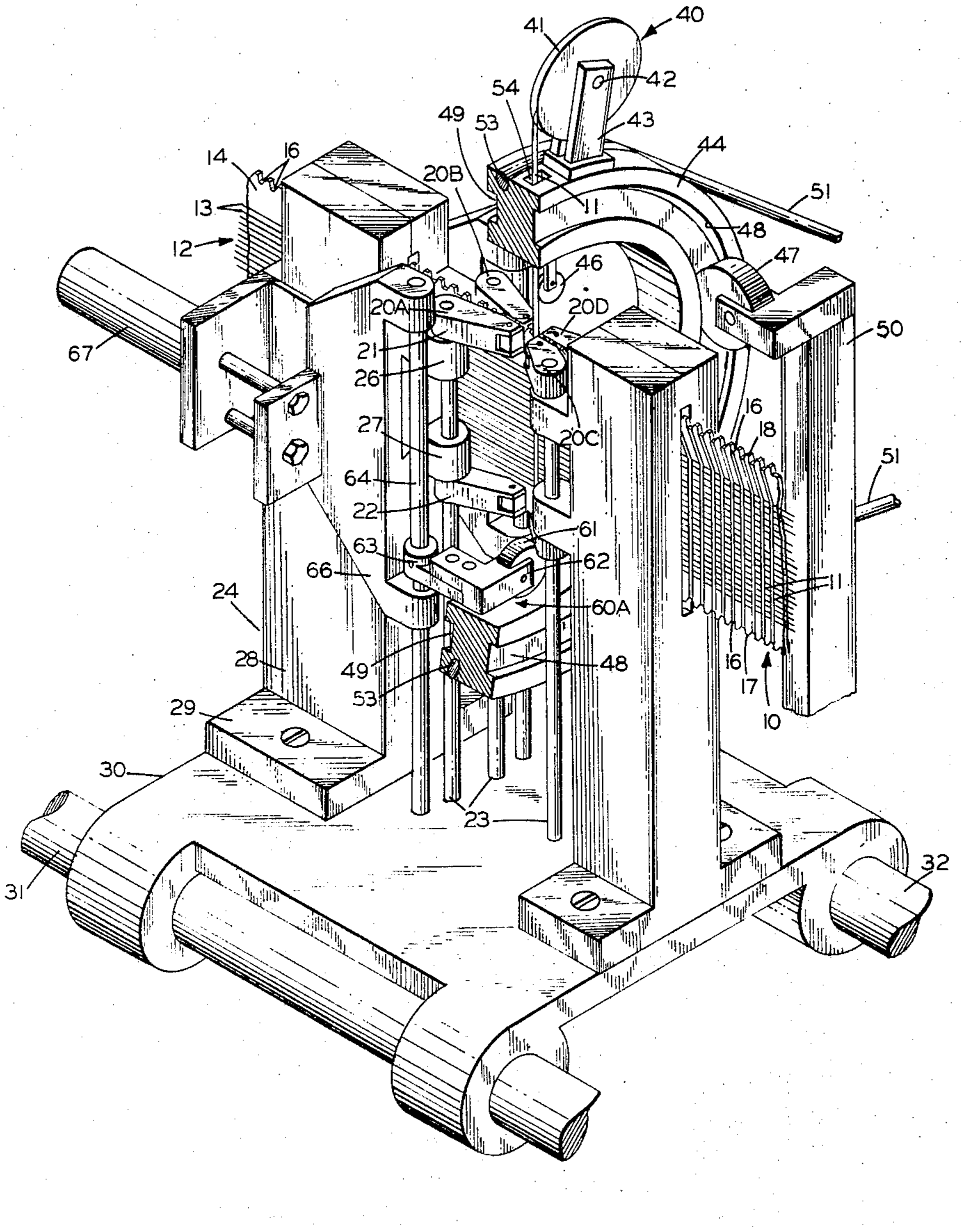
FIG. 2 is a perspective view, partly in section, of a portion of the machine shown in FIG. 1, taken generally along the line 2—2 of FIG. 1.

Referring first to FIGS. 1 and 2 of the drawing, there is illustrated apparatus for forming a twistor memory tape 10 by winding and bonding an adhesive-coated conductive ribbon 11 around a twistor cable tape 12 on an irregular transverse path.

The twistor memory tape 10 is composed of a copper ribbon 11 wrapped around and bonded to the twistor cable tape 12 on an irregular transverse path. The twistor cable tape 12 is composed of a plurality of cables or wires 13 laminated within a plastic sheet 14. The tape 12 has aligned notches 16—16 along an edge 17 and an edge 18 of the plastic sheet 14 for receiving the ribbon 11. An indeterminate length of pre-processed tape 12 is furnished on a supply reel 15 and the processed tape 10 is wrapped on a take-up reel 19. The major functional units of the apparatus include:

(A) a clamping unit 20, including clamps 20A–20B and 20C–20D which hold and advance or retract the tape 12;

(B) a winding head 40 which rotates in fixed steps about the longitudinal axis of the tape 12 to place the ribbon 11 transverse to the axis of the tape 12;

(C) a pressing and rolling unit 60, including a pair of heated rollers 60A–60B which advance and retract across the tape 12 in fixed steps to press the ribbon 11 against the tape 12; and (D) a tape feeding and tensioning mechanism 80 for the tape 12.

The specific construction of these major units is described in detail below, followed by a description of the overall operation.

*Clamping unit 20*

The clamps 20A–20B and 20C–20D advance and retract and hold the twistor memory tape 10 before and after the ribbon 11 is wrapped about and bonded to the twistor cable tape 12. The clamps 20A–20D are identical in structure and operation. For example, the clamp 20A is composed of an upper arm 21 and a lower arm 22 affixed to a rotatable shaft 23. The shaft 23 is rotatably connected to an L-shaped support member 24 through bearings 26, 27 affixed to a vertical leg 28 of the member 24. A horizontal leg 29 of the member 24 is rigidly attached to a rectangular platform 30. The platform 30 is slidable along shafts 31, 32 supported on a base frame (not shown) to provide the advancing or retracting movements for the clamps 20A, 20B and 20C, 20D. The platform 30 is advanced or retracted in fixed steps by a solenoid (not shown) mounted on the base frame.

The positioning clamps 20A–D perform the following steps in sequence (1) grip both sides of the tape or strip, (2) advance the strip a fixed step, (3) hold the strip for a dwell time, (4) release the grip and retract a fixed step, (5) grip both sides of the strip and retract another fixed step, and (6) hold the strip in preparation for the next cycle.

*Winding head 40*

Figure 3A:
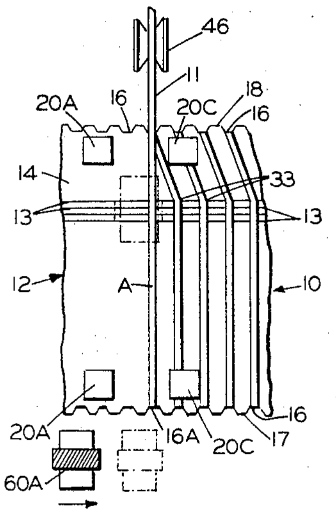
FIGS. 3A–3D are a succession of fragmentary front views, taken generally along the line 3—3 in FIG. 1 and illustrating successive stages in one cycle of operation.

Referring to FIG. 3A, the clamps 20A and 20C are shown in an initial position holding the twistor cable or pre-processed tape 12 and the twistor memory or processed tape 10, respectively, to allow the winding head 40 (FIGS. 1 and 2) to rotate and place the ribbon 11 against the tape 12 to form a winding A. The winding A is placed across the back surface of the tape 12 from the edge 18 to the edge 17 in a plane perpendicular to the wires 13 and across the front surface of the tape 12, in a plane perpendicular to the wires 13 from the edge 17 to a point 33 (FIG. 3A).

Referring to FIG. 2, the winding head 40 rotates in fixed steps about the tape 12 to place the ribbon 11 transverse to and in contact with the tape 12. The winding head 40 is composed of a spool 41 mounted on a friction roller 42 which retards the rotation of the spool 41 to maintain tension on the ribbon 11. The roller 42 is mounted on a support 43 which is affixed to a rotating ring 44. The ring 44 is supported by and rotatable on a plurality of support rollers 47—47 (one shown) which are adapted to fit in a pair of circular, U-shaped grooves 48 and 49 formed in opposite side faces of the ring as illustrated in FIG. 2. The rollers 47—47 are mounted on posts 50 (one shown) affixed to the base frame (not shown), so that the platform 30 may move independently of the winding head 40. The rotatable ring 44 is driven by means of a belt 51 running from a motor 52 (FIG. 1). The ring 44 has a U-shaped peripheral groove 53 adapted to receive and transmit torque from the belt 51. The ribbon 11 passes from the spool 41 through an aperture 54 in the ring 44 and over a guide pulley 46 before aligning with the notches 16—16 in the tape 12. The winding head 40 is mounted independently of the platform 30, but the fixed rotational steps of the winding head are synchronized with the movements of the clamps 20A–20D and the rollers 60A–60B (FIGS. 3A–D).

The spool 41 rotates about the longitudinal axis of the strip to perform the following steps in a sequence synchronized with the movements of the strip and the pressing rollers: (1) the spool rotates around the strip slightly less than one full revolution to place the strand in contact with one side of the strip and in proximity to the opposite side of the strip; (2) the spool dwells in its circumferential path while the pressing rollers advance a predetermined distance across the strip to hold the strand onto the strip; (3) the pressing rollers stop and the strip and rollers are both advanced a predetermined distance; (4) the spool rotates in its circumferential path to complete the revolution and dwells in preparation for the next cycle, whereby the length of strand between the pressing rollers and edge of the strip is placed at an angle with the path of the preceding length of strand; and (5) the pressing rollers complete the advancement across the strip to secure the offset length of strand to the strip and then retract across the strip to a dwell position in preparation for the next cycle.

*Rollers 60A–60B*

Referring to FIG. 2, the rollers 60A–60B are identical in structure and operation so that the description of one suffices for the other. The rollers 60A is composed of a cylinder 61, heated by suitable means (not shown). The cylinder 61 is supported by an adjustable bracket 62 mounted on an arm 63. The arm 63 is affixed to a shaft 64 which is mounted on a support member 66 for slidable movement in a plane transverse to the longitudinal axis of the tape 12.

The member 66 is slidably mounted on the leg 28 of the member 24 and is reciprocated by an air cylinder 67 to move the cylinder 61 in a plane parallel to the longitudinal axis of the tape 12. The shaft 64 is mounted for vertical movement by means (not shown) to bring the cylinder 61 into contact with the ribbon along a path transverse to the wires 13 embedded in the tape 12. The movements of the rollers 60A–60B are synchronized with the movements of the clamps 20A–20D and the winding head 40 (FIGS. 3A–D).

The pressing rollers 60A, 60B are of a width to press two turns of the strand on both sides of the strip as the rollers perform the following steps in sequence: (a) advance parallel to the longitudinal axis of the strip from a retracted position to a traversing position; (b) advance from the traversing position a predetermined distance across the strip to bond and hold the strand onto both sides of the strip; (c) move with the strip when it is advanced a fixed step; (d) advance the remaining distance across the strip to secure the remaining strand onto the strip; and (e) retract to repress the strand onto both sides of the strip and await the next strip advancement.

The pressing rollers 60A–60B advance across the tape 12 to the point 33 and then stop to hold the ribbon 11 onto the tape 12. The platform 30 is advanced by a solenoid (not shown) along the shafts 31, 32 a fixed distance $x$ (FIG. 3B) which places the ribbon 11 between the rollers 60A, 60B and a ribbon guide pulley 46 at an angle over a notch 16, creating a pitch $p$ (FIG. 3C) between the ribbon windings. The movements of the pressing rollers 60A–60B and the winding head 40 are synchronized with the movements of the clamps 20A–20D. After the movement of the distance $x$ (FIG. 3B), the rollers 60A–60B advance across the strip to the edge 18 before retracting to the initial position (phantom lines). After the rollers 60A–60B have retracted, the shafts 23 are rotated by an air motor (not shown) to release the grip of the clamps 20A–20D on the tape 10 and the base 30 retracts the pitch distance $p$. The clamps 20A–20D regrip the tape 10 (phantom lines, FIG. 3C) and the platform 30 retracts the distance ($x$–$p$) which aligns the notches 16—16 (FIG. 3D) with the guide pulley 46. The clamps 20A–20D are now positioned clear of the ribbon windings, which allow the winding head 40 to rotate and place the ribbon 11 as illustrated in FIG. 3A preparatory to another cycle of operation.

*The feeding and tensioning mechanism 80*

Referring to FIG. 1, the wheels 80A–80B and a brake 81 maintain tension on the tape 10 to allow the positioning clamps 20A–20D to release the tape 10 and retract the pitch distance $p$. The wheels 80A–80B are in contact with both sides of the tape 10 and are urged to rotate by a torque motor 82. The brake 81 is composed of spaced friction plates 83–83 located on opposite sides of the tape 12 and urged together by an adjustable spring 86. The frictional effect imposed on the tape 12 by the brake 81 is set at a level which exceeds the tension exerted by the whels 80A–80B, but which allows the positioning clamps 20A–20D to advance the tape 12.

*Operation*

In order to set up the apparatus for a succession of winding and bonding operations, a length of the twistor cable tape 12 is unwound from the supply reel 15 (FIG. 1), is passed through the brake 81, the positioning clamps 20A–20D, the tensioning wheels 80A–80B, and is wrapped on the take-up reel 19. The tape 12 is thus positioned concentrically within the winding head 40 for intermittent advancement by the clamps 20A–20D, from left to right in the drawings, and the completed memory tape 10 is taken up on the reel 19. The tensioning wheels 80A–80B and brake 81 maintain tension on the tape 12 at all times.

Figure 4:
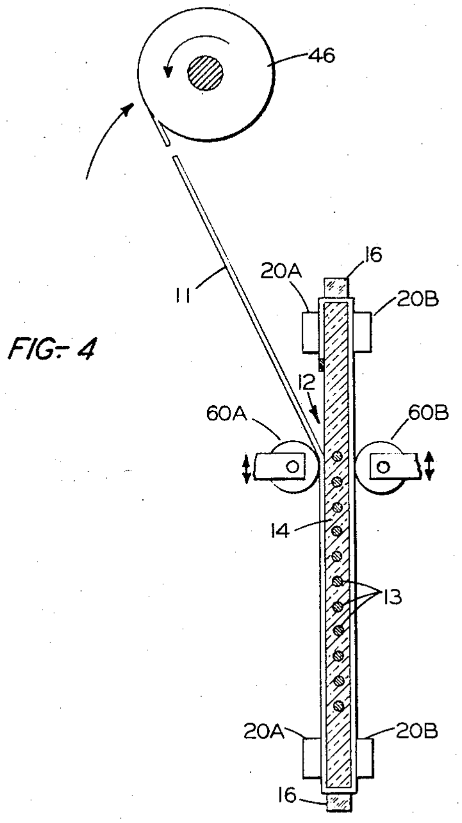
FIG. 4 is a sectional side view taken along the line 4—4 of FIG. 3B.

FIG. 3A depicts what will be regarded as an initial point in the continuous winding and bonding process. At this point in time, the ribbon 11 has just been wound along the under flat surface of the tape 12 and around the next successive one of the notches 16—16 along the front edge 17 (this notch is designated "16A"). The ribbon is maintained in precise coplanar alignment with the ribbon-applicator roller or winding head 40 by the now-stationary clamps 20A–20D. The applicator 40 has also been rotated and stopped at a position where it has almost completed a full revolution (FIG. 4), which brings the ribbon into close proximity with the upper surface of the tape 12. With this initial position in mind, the first step in the cycle is to advance the heated pressing rollers 60A–60B parallel to the tape 12 from an initial, retracted position shown in solid lines in FIG. 3A to a traversing position shown in phantom lines. This movement is achieved by operation of the air cylinder 67 in conventional fashion. This aligns the right edge (FIG. 3A) of the rollers with the section of the ribbon winding A, just completed. Next, the rollers 60A–60B advance transversely across the tape 12 from the phantom-line position of FIG. 3A to the solid-line position of FIG. 3B. During this transverse movement, the heated rollers 60A–60B press against the ribbon 11 just wound from opposite sides of the tape 12 to bond the ribbon 11 to the tape 12. The rollers are stopped at the position 33, and there function to hold the ribbon 11 securely against the tape 12. This allows the platform 30 to advance the distance $x$, so that the ribbon 11 now becomes aligned with the next notch, 16B, along the rear edge 18, which is located the pitch distance $p$ from the winding A.

Figure 3B:
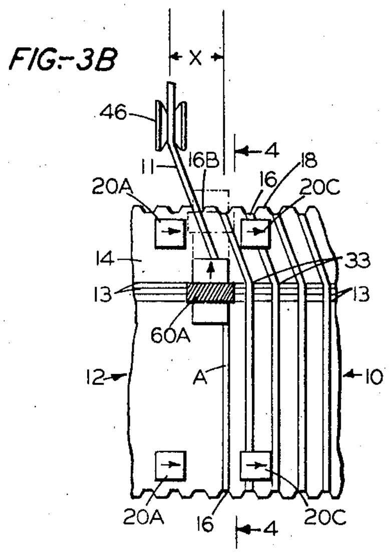
Figure 3C:
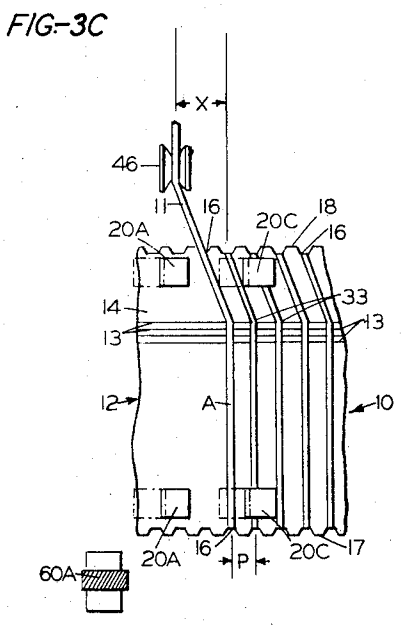

After these pressing and indexing steps have been completed, the winding head 40 rotates a partial revolution to wind the ribbon 11 the rest of the way about the upper surface and into and around the notch 16B. During this stage, and only during this stage, the ribbon 11 is wound at an angle as shown in FIG. 3B between the rollers 60A–60B and the notch 16B. At this point, the rollers 60A–60B continue their forward movement across the tape 12, all the way to the rear edge 18. This heats and presses the angled section just wound against the tape 12, the rollers being more than sufficiently long to cover all of two adjacent courses in one pass.

Figure 3D:
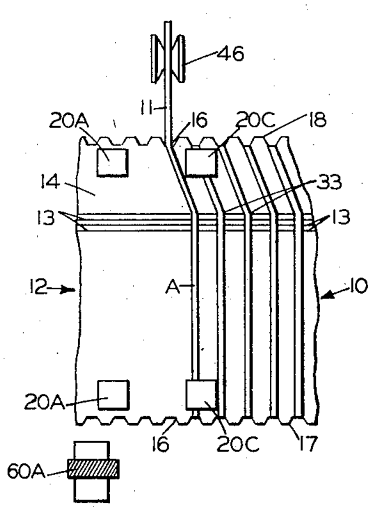

After this, the rollers 60A–60B are retracted to their initial positions shown in FIGS. 3A and 3D, the rollers repressing the ribbon 11 while retracting. After the rollers 60A–60B have retracted the clamps 20A–20D (FIG. 3C) are pivoted apart to release the tape 12, and the platform 30 retracts the pitch distance $p$. The clamps 20A–20D then are reclosed to grip a following section of the tape 12, at the position shown in phantom lines in FIG. 3C. The platform 30 then retracts the fixed distance $(x-p)$ to return the rollers 60A–60B to their initial, nonobstructing position in preparation for the next winding (FIG. 3D). The motor 52 is then started again to revolve the applicator roller 40 almost 360° around the tape 12, back to the FIG. 3A position. This, as previously described, completes one full cycle and places the ribbon 11 along both sides of the tape 12, as illustrated in FIG. 3A. The ribbon 11 is now in position for the next cycle which follows the above sequence of steps.

It is to be understood that the above-described embodiment is merely illustrative of the principles of the invention, and that other embodiments may be devised by persons skilled in the art which embody these principles and fall within the spirit and scope of the invention.

What is claimed is:

1. The method of winding a strand in a modified helical pattern about an article having a longitudinal axis about which such winding can take place, which comprises, in the order named:

(a) positioning the article with respect to a winding plane such that the longitudinal axis is perpendicular to the winding plane and a first circumferential region along the article lies in the winding plane;

(b) winding the strand about the article through an arc less than one full revolution to form a partial convolution of the strand in the winding plane;

(c) partially moving a pair of pressing rollers across the article in timed relationship to the winding step to bond the partial convolution in place against the article;

(d) causing relative movement between the article and the winding plane to displace the partial convolution from the winding plane;

(e) winding the strand further about the article to complete a full revolution, thus forming an angled section of the strand defining the end of one convolution due to the displacement provided in step (d);

(f) completing the movement of the pair of pressing rollers to bond the angled section of the convolution to the article to hold that convolution in place; and then (g) repeating steps (a) to (f) to wind the strand about successive regions of the article in a modified helix in which a portion of each convolution lies in a plane parallel to the winding axis and an end section of each convolution is wound at an angle.

2. The method as recited in claim 1 wherein: the strand and article are composed of materials having adjacent surfaces such that the contacting surfaces of the two may be bonded together by pressure.

3. The method of winding a strand in a modified helical pattern about a tape comprising, in the order named, (a) positioning the tape with respect to a winding plane such that its longitudinal axis is perpendicular to the winding plane;

(b) winding the strand about the tape, in the winding plane, through an arc less than one full revolution to form a partial convolution of the strand;

(c) moving a pair of pressing rollers transversely across the tape, in timed relationship to the winding step, to bond the partial convolution to the tape;

(d) halting the transverse movement of the pressing rollers;

(e) longitudinally moving the tape and pressing rollers with respect to the winding plane to displace the partial convolution from the winding plane, the longitudinal movement being such that the pressing rollers continue to intersect with said winding plane;

(f) winding the strand further about the tape to complete a full revolution, thus forming an angled section of the strand defining the end of one convolution due to the displacement provided in step (e);

(g) continuing the movement of the pressing rollers in he transverse direction to bond the angled section of he convolution to the tape;

(h) reversing the movement of the pressing rollers in the transverse direction across the tape to re-press the convoluted strand onto said tape; and (i) repeating steps (a) through (h) to wind the strand about successive portions of the tape in a modified helix in which a portion of each convolution lies in a plane parallel to the winding axis and an end section of each convolution is wound at an angle.

References Cited

UNITED STATES PATENTS

| | | | |
|---|---|---|---|
| 2,393,548 | 1/1946 | McCoy | 140—92.1 X |
| 2,772,718 | 12/1956 | Magnuson | 156—172 |
| 3,276,104 | 12/1966 | Skogstad et al. | 29—605 X |
| 3,360,410 | 12/1967 | Romanin | 156—172 |

JOHN F. CAMPBELL, *Primary Examiner.*

C. E. HALL, *Assistant Examiner.*

U.S. Cl. X.R.

29—604; 156—172; 242—9